United States Patent
Owens et al.

(12) 
(10) Patent No.: US 6,423,673 B1
(45) Date of Patent: Jul. 23, 2002

(54) AZEOTROPE-LIKE COMPOSITIONS AND THEIR USE

(75) Inventors: John G. Owens, Woodbury; Dean S. Milbrath, Stillwater, both of MN (US)

(73) Assignee: 3M Innovation Properties Company, St. Paul, MN (US)

( * ) Notice: Subject to any disclaimer, the term of this patent is extended or adjusted under 35 U.S.C. 154(b) by 0 days.

(21) Appl. No.: 09/955,789

(22) Filed: Sep. 19, 2001

Related U.S. Application Data

(63) Continuation-in-part of application No. 09/948,600, filed on Sep. 7, 2001.

(51) Int. Cl.[7] .............................. C11D 3/24; C11D 7/28
(52) U.S. Cl. .................. 510/177; 510/201; 510/204; 510/245; 510/407; 510/408; 510/412; 510/415
(58) Field of Search ................................ 510/201, 204, 510/245, 407, 408, 412, 415, 177

(56) References Cited

FOREIGN PATENT DOCUMENTS

| WO | WO93/11280 | 6/1993 |
| WO | WO00/56833 | 9/2000 |
| WO | 01/05468 | * 1/2001 |

OTHER PUBLICATIONS

U.S. Application Serial No. 09/780,256, filed Feb. 9, 2001, entitled "Molten Magnesium Cover Gas Using Fluorocarbons".

* cited by examiner

*Primary Examiner*—Charles Boyer
(74) *Attorney, Agent, or Firm*—Lisa M. Fagan

(57) ABSTRACT

The invention provides azeotrope-like compositions consisting essentially of 1,1,1,3,3-pentafluorobutane and a fluorinated ketone, $R_fC(O)CF(CF_3)_2$, where $R_f$ is $CF_3CF_2$, $CF_3CF_2CF_2$, or $(CF_3)_2CF$.

11 Claims, 2 Drawing Sheets

AZEOTROPE-LIKE COMPOSITIONS AND THEIR USE

CROSS-REFERENCE TO RELATED APPLICATION

This application is a continuation-in-part of a U.S. patent application filed Sep. 7, 2001, Ser. No. 09/948,600, entitled "AZEOTROPE-LIKE COMPOSITIONS AND THEIR USE," on behalf of John G. Owens and Dean S. Milbrath. The entire disclosure of Ser. No. 09/948,600 is incorporated herein by reference.

FIELD OF THE INVENTION

This invention relates to azeotropes, azeotrope-like compositions, and methods of using azeotropes and azeotrope-like compositions to clean substrates, deposit coatings, transfer thermal energy, lubricate working operations, and aid in foam blowing.

BACKGROUND OF THE INVENTION

Chlorofluorocarbons (CFCs), hydrochlorofluorocarbons (HCFCs), and hydrochlorocarbons (HCCs, e.g., 1,1,1-trichloroethane and carbon tetrachloride) have been used in a wide variety of solvent applications such as drying, cleaning (e.g., the removal of flux residues from printed circuit boards), and vapor degreasing. These materials have also been used in refrigeration and heat-transfer processes. While these materials were initially believed to be environmentally benign, they have now been linked to ozone depletion. According to the Montreal Protocol and its attendant amendments, production and use of CFCs must be discontinued (see, e.g., P. S. Zurer, "Looming Ban on Production of CFCs, Halons Spurs Switch to Substitutes," *Chemical & Engineering News*, page 12, Nov. 15, 1993). The characteristics sought in replacements, in addition to low ozone depletion potential, typically have included boiling point ranges suitable for a variety of solvent cleaning applications, low flammability, and low toxicity. Solvent replacements also should have the ability to dissolve both hydrocarbon-based and fluorocarbon-based soils. Preferably, solvent replacements also have low toxicity, have no flash points (as measured by ASTM D3278-98 e-1, "Flash Point of Liquids by Small Scale Closed-Cup Apparatus" otherwise known as SETAFLASH), have acceptable stability, have short atmospheric lifetimes, and have low global warming potentials.

Certain perfluorinated (PFCs) and highly fluorinated hydrofluorocarbon (HFCs) materials have been evaluated as CFC and HCFC replacements in solvent applications. But PFCs and non-flammable HFCs have high global warming potentials. While these materials are generally sufficiently chemically stable, nontoxic, and non-flammable to be used in solvent applications, PFCs tend to persist in the atmosphere, and PFCs and HFCs are generally less effective than CFCs and HCFCs for dissolving or dispersing hydrocarbon materials. Some HFCs are also flammable.

Hydrofluoroethers (HFEs), or highly fluorinated ethers, have also gained interest as replacements for CFCs and HCFCs. HFEs are also chemically stable, have low toxicity, are non-flammable, and are non-ozone depleting. Mixtures of PFCs, HFCs, or HFEs with other organic solvents tend to be better solvents and dispersants for hydrocarbons than PFC, HFCs, or HFEs alone.

Fluorinated ketones are particularly useful as fire extinguishing agents and as a magnesium cover gas. They are cost effective and have a low global warming potential. But they have limited solvent strength.

Many azeotropes possess properties that make them useful solvents. For example, azeotropes have a constant boiling point that avoids boiling temperature drift during processing and use. In addition, when an azeotrope is used as a solvent, the properties of the solvent remain constant because the composition of the solvent does not change during boiling or reflux. Azeotropes that are used as solvents also can be recovered conveniently by distillation.

Thus, there is a need for azeotropes or azeotrope-like compositions that have good solvent strength, low flammability, are non-ozone depleting, and have a relatively short atmospheric lifetime so that they do not significantly contribute to global warming (i.e., low global warming potential).

SUMMARY OF THE INVENTION

The present invention provides azeotropes and azeotrope-like compositions of a hydrofluorocarbon and fluorinated ketones. Advantageously, these compositions are non-flammable, have good solvency, are non-ozone depleting, and have a relatively short atmospheric lifetime. Further, they are cost-effective.

In one aspect, the present invention provides azeotropes and azeotrope-like compositions comprising or consisting essentially of a hydrofluorocarbon and a fluorinated ketone. The hydrofluorocarbon is 1,1,1,3,3-pentafluorobutane. The fluorinated ketone is represented by the general formula $R_fC(O)CF(CF_3)_2$ where $R_f$ is $CF_3CF_2-$, $CF_3CF_2CF_2-$, or $(CF_3)_2CF-$.

While the concentrations of the hydrofluorocarbon and the fluorinated ketone included in the azeotrope-like composition may vary somewhat from the concentrations found in the azeotrope formed between them, the boiling points of the azeotrope-like compositions are below the boiling point of the minimum boiling point component. Thus, the azeotrope-like compositions of the present invention include the corresponding azeotrope. Preferably the azeotrope-like compositions are non-flammable.

In another aspect, the present invention provides a method of cleaning objects by contacting the object to be cleaned with one or more of the azeotrope-like compositions of this invention or the vapor of these compositions until undesirable contaminants or soils on the object are dissolved, dispersed, or displaced, and rinsed away.

The present invention also provides coating compositions comprising an azeotrope-like composition and coating material that are useful in the coating process.

In yet another aspect, the present invention provides a method of depositing coating compositions on substrates using the azeotrope-like compositions as solvents or carriers for the coating material. The process comprises the step of applying to at least a portion of at least one surface of a substrate a coating composition comprising: (a) an azeotrope-like composition; and (b) at least one coating material that is soluble or dispersible in the azeotrope-like composition. Preferably, the process further comprises the step of removing the azeotrope-like composition from the coating composition, for example, by evaporation.

The azeotrope-like compositions of the present invention are also useful in fully volatile working fluids. These working fluids act to lubricate the cutting or forming processes used to fabricate metal, cermet, and composite parts and fully evaporate from the surfaces leaving little, if any, residue.

In yet another aspect, the present invention provides a method of transferring thermal energy using the azeotrope-like compositions as heat-transfer fluids.

DETAILED DESCRIPTION OF ILLUSTRATIVE EMBODIMENTS

Figure 1:
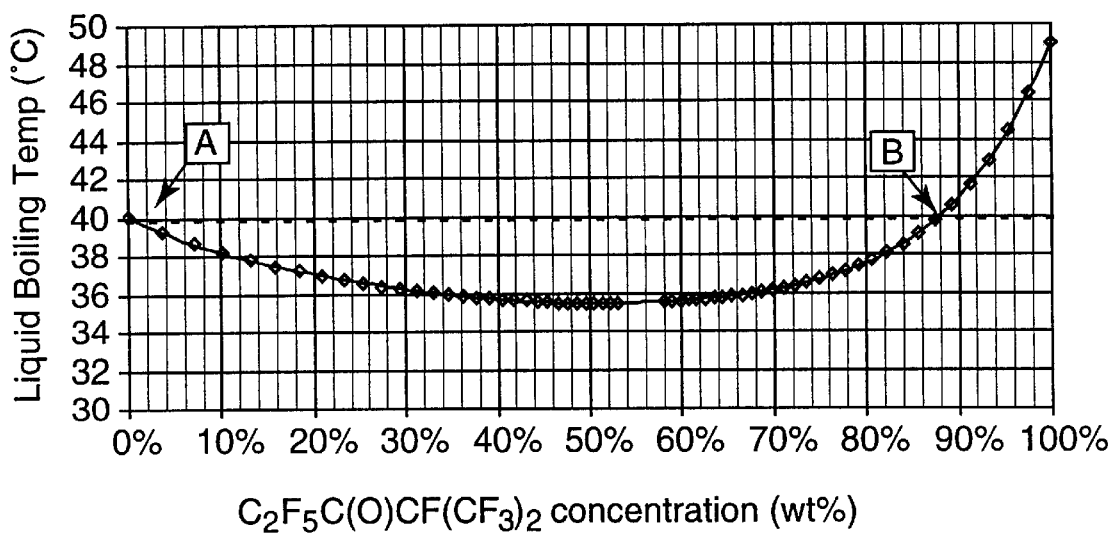
FIG. 1 is a graph of the boiling point versus the concentration of 1,1,1,3,3-pentafluorobutane and $C_2F_5C(O)CF(CF_3)_2$. Points A and B indicate the endpoints for the azeotrope-like composition.
Figure 2:
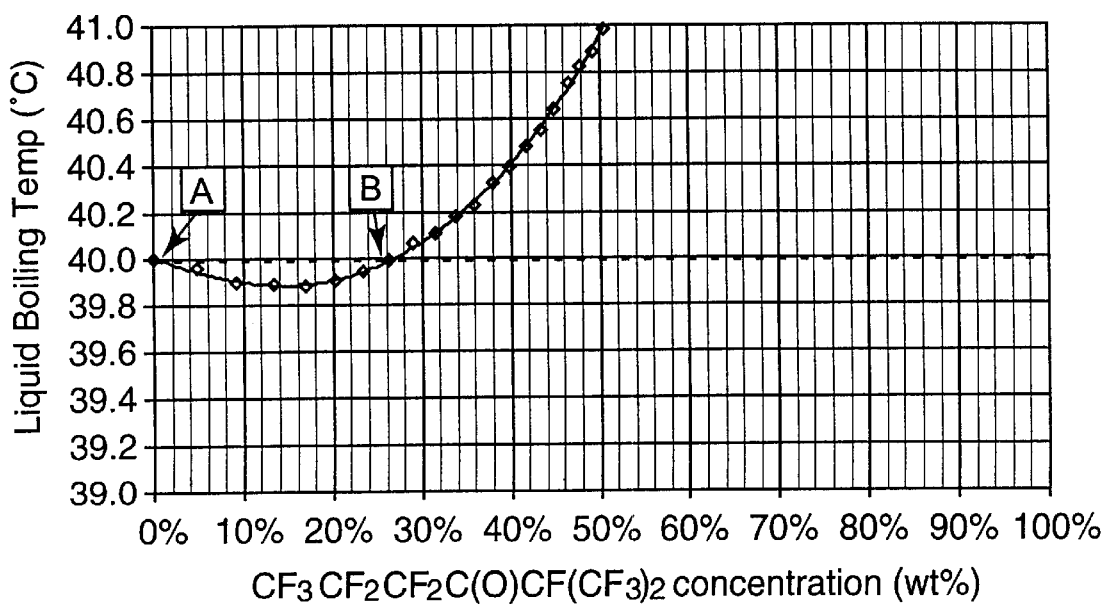
FIG. 2 is a graph of the boiling point versus the concentration of 1,1,1,3,3-pentafluorobutane and $CF_3CF_2CF_2C(O)CF(CF_3)_2$. Points A and B indicate the endpoints for the azeotrope-like composition.
Figure 3:
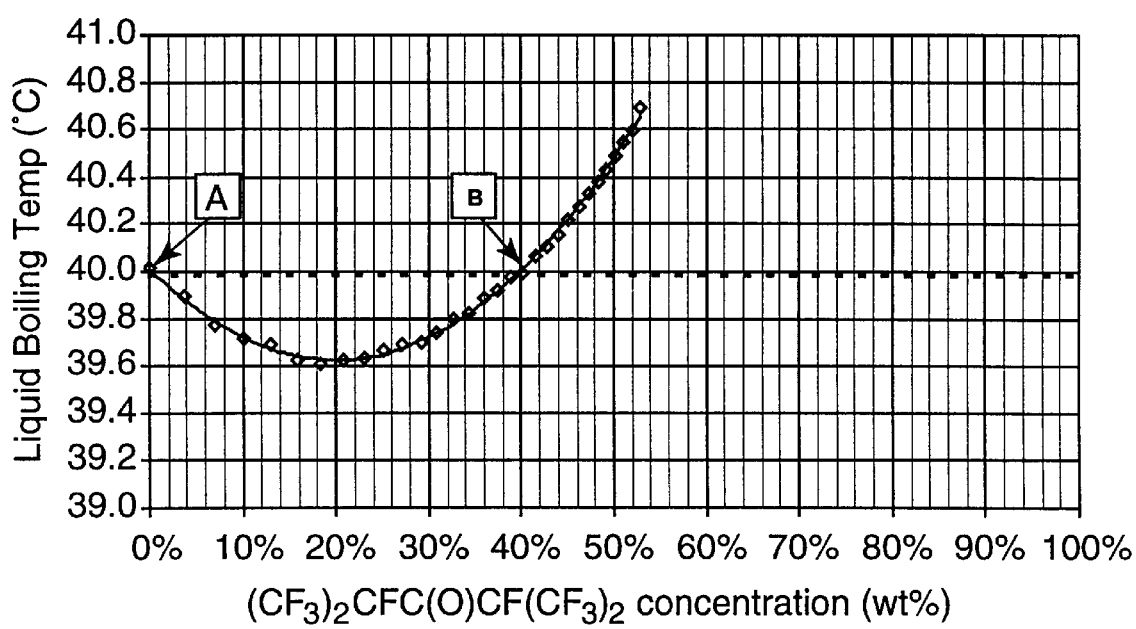
FIG. 3 is a graph of the boiling point versus the concentration of 1,1,1,3,3-pentafluorobutane and $(CF_3)_2CFC(O)CF(CF_3)_2$. Points A and B indicate the endpoints for the azeotrope-like composition.

An azeotropic composition or azeotrope is a constant boiling liquid mixture of two or more substances that behaves like a single substance in that the vapor produced by partial evaporation of liquid at its boiling point has the same composition as the liquid. Azeotropic compositions are constant boiling mixtures that exhibit either a maximum or a minimum boiling point as compared with other compositions of the same substances.

An azeotropic-like composition includes the corresponding azeotrope. Azeotrope-like compositions of the present invention are mixtures of a hydrofluorocarbon and a fluorinated ketone that exhibit strong thermodynamic non-ideality. A thermodynamically ideal or slightly non-ideal mixture has a boiling point between the boiling points of the two components. But the azeotrope-like compositions of the present invention boil at temperatures that are below the boiling point of the minimum boiling point component. See the Figures. Preferably, the azeotrope-like compositions are non-flammable.

The concentration of the hydrofluorocarbon and the fluorinated ketone in a particular azeotrope-like composition may vary substantially from the corresponding azeotropic composition, and the magnitude of this permissible variation depends upon the fluorinated ketone. More preferably, the azeotropic-like composition contains essentially the same concentrations of the hydrofluorocarbon and the fluorinated ketone as are contained in the azeotrope formed between them at ambient pressure. The preferred compositions exhibit no significant change in the solvent power of the composition over time.

Azeotropes retain many of the properties of the individual component solvents, which can enhance performance and usefulness over the individual components because of the combined properties.

The azeotrope-like compositions of this invention may also contain, in addition to the hydrofluorocarbon and the fluorinated ketone, small amounts of other compounds that do not interfere in the formation of the azeotrope. For example, co-solvents or small amounts of surfactants may be present in the azeotrope-like compositions of the present invention to improve the dispersibility or the solubility of materials, such as water, soils, or coating materials (e.g., perfluoropolyether lubricants and fluoropolymers), in the azeotrope-like composition or small amounts of lubricious additives to enhance the lubricating properties of the azeotrope-like composition.

Hydrofluorocarbon

The hydrofluorocarbon of the present invention is 1,1,1,3,3-pentafluorobutane. The hydrofluorocarbon of the present invention is commercially available as SOLKANE™ 365 mfc from Solvay (Societe Anonyme, Brussels, Belgium).

Fluorinated Ketone

Fluorinated ketones useful in this invention include those represented by the general formula:

$R_fC(O)CF(CF_3)_2$ where $R_f$ is $CF_3CF_2$—, $CF_3CF_2CF_2$—, or $(CF_3)_2CF$—.

The fluorinated ketones (i.e., perfluoroketones) of this invention can be prepared as described in, for example, U.S. Pat. No. 3,185,734 (Fawcett et al.) and J. Am. Chem. Soc., v. 84, pp. 4285–88, 1962, by hexafluoropropylene addition to a perfluoroacyl halide (e.g., $CF_3CF_2COF$) in an anhydrous environment (e.g., in diethylene glycol dimethyl ether, or "diglyme") in the presence of fluoride ion at an elevated temperature, typically at around 50 to 80° C. The diglyme/fluoride ion mixture can be recycled for subsequent fluorinated ketone preparations, e.g., to minimize exposure to moisture. When this reaction scheme is employed, a small amount of hexafluoropropylene dimer and/or trimer may reside as a by-product in the branched perfluoroketone product. The amount of dimer and/or trimer may be minimized by gradual addition of hexafluoropropylene to the perfluoroacyl halide over an extended time period, e.g., several hours. These dimer and/or trimer impurities can usually be removed by distillation from the perfluoroketone. In cases where the boiling points are too close for fractional distillation, the dimer and/or trimer impurity may be conveniently removed in an oxidative fashion by treating the reaction product with a mixture of an alkali metal permanganate in a suitable organic solvent such as acetone, acetic acid, or a mixture thereof at ambient or elevated temperatures, preferably in a sealed vessel. Acetic acid is a preferred solvent for this purpose. It has been observed that acetic acid tends not to degrade the ketone whereas, in some instances some degradation of the ketone was noted when acetone was used. The oxidation reaction is preferably carried out at an elevated temperature, i.e., above room temperature, preferably from about 40° C. or higher, to accelerate the reaction. The reaction can be carried out under pressure, particularly if the ketone is low boiling. The reaction is preferably carried out with agitation to facilitate complete mixing of two phases that may not be totally miscible.

Azeotrope-like compositions comprising or consisting essentially of 1,1,1,3,3-pentafluorobutane and the fluorinated ketones include the following:

(i) compositions consisting essentially of about 12.5 to about 99.0 weight percent of 1,1,1,3,3-pentafluorobutane and about 1.0 to about 87.5 weight percent of $C_2F_5C(O)CF(CF_3)_2$ that boil below about 40° C. at about 760 torr;

(ii) compositions consisting essentially of about 61.0 to about 99.0 weight percent of 1,1,1,3,3-pentafluorobutane and about 1.0 to about 39.0 weight percent of $(CF_3)_2CFC(O)CF(CF_3)_2$ that boil below about 40° C. at about 760 torr; and (iii) compositions consisting essentially of about 73.5 to about 99.0 weight percent of 1,1,1,3,3-pentafluorobutane and about 1.0 to about 26.5 weight percent of $CF_3CF_2CF_2C(O)CF(CF_3)_2$ that boil below about 40° C. at about 760 torr.

Preferably, the azeotrope-like compositions are non-flammable. That is, they do not have a closed-cup flash point. These preferred azeotrope-like compositions comprising or consisting essentially of 1,1,1,3,3-pentafluorobutane and the fluorinated ketones include the following:

(i) compositions consisting essentially of about 12.5 to about 95.0 weight percent of 1,1,1,3,3-pentafluorobutane and about 5.0 to about 87.5 weight percent of $C_2F_5C(O)CF(CF_3)_2$ that boil below about 40° C. at about 760 torr;

(ii) compositions consisting essentially of about 61.0 to about 95.0 weight percent of 1,1,1,3,3-pentafluorobutane and about 5.0 to about 39.0 weight percent of $(CF_3)_2CFC(O)CF(CF_3)_2$ that boil below about 40° C. at about 760 torr; and (iii) compositions consisting essentially of about 73.5 to about 95.0 weight percent of 1,1,1,3,3-pentafluorobutane and about 5.0 to about 26.5 weight percent of $CF_3CF_2CF_2C(O)CF(CF_3)_2$ that boil below about 40° C. at about 760 torr.

The azeotrope compositions containing 1,1,1,3,3-pentafluorobutane and the fluorinated ketones include the following:

(i) compositions consisting essentially of about 48.3 weight percent of 1,1,1,3,3-pentafluorobutane and about 51.7 weight percent of $C_2F_5C(O)CF(CF_3)_2$ that boil at about 35.4° C. at about 760 torr;

(ii) compositions consisting essentially of about 79.0 weight percent of 1,1,1,3,3-pentafluorobutane and about 21.0 weight percent of $(CF_3)_2CFC(O)CF(CF_3)_2$ that boil at about 39.6° C. at about 760 torr; and (iii) compositions consisting essentially of about 86.7 weight percent of 1,1,1,3,3-pentafluorobutane and about 13.3 weight percent of $CF_3CF_2CF_2C(O)CF(CF_3)_2$ that boil at about 39.9 at about 760 torr.

Preferably, the azeotrope-like compositions are homogeneous; i.e., they form a single phase under ambient conditions, i.e., at room temperature and atmospheric pressure.

The azeotrope-like compositions are prepared by mixing the desired amounts of hydrofluorocarbon, fluorinated ketone, and any other minor components such as surfactants or lubricious additives together using conventional mixing means.

Methods

In particular, the azeotrope-like compositions of the present invention may be used in cleaning processes, in heat-transfer processes, as refrigerants, as a working fluid, as a foam blowing agent, as a coating liquid, and the like.

Cleaning

The cleaning process of the present invention can be carried out by contacting a contaminated substrate with one of the azeotrope-like compositions of this invention until the contaminants on the substrate are dissolved, dispersed, or displaced in or by the azeotrope-like composition, and then removing (for example by rinsing the substrate with fresh, uncontaminated azeotrope-like composition or by removing a substrate immersed in an azeotrope-like composition from the bath and permitting the contaminated azeotrope-like composition to flow off of the substrate) the azeotrope-like composition containing the dissolved, dispersed, or displaced contaminant from the substrate. The azeotrope-like composition can be used in either the vapor or the liquid state (or both), and any of the known techniques for "contacting" a substrate can be utilized. For example, the liquid azeotrope-like composition can be sprayed or brushed onto the substrate, the vaporous azeotrope-like composition can be blown across the substrate, or the substrate can be immersed in either a vaporous or a liquid azeotrope-like composition. Elevated temperatures, ultrasonic energy, and/or agitation can be used to facilitate the cleaning. Various different solvent cleaning techniques are described by B. N. Ellis in *Cleaning and Contamination of Electronics Components and Assemblies*, Electrochemical Publications Limited, Ayr, Scotland, pages 182–94 (1986).

Both organic and inorganic substrates can be cleaned by the processes of the invention. Representative examples of the substrates include metals; ceramics; glass; silicon wafers; polymers such as: polycarbonate, polystyrene and acrylonitrile-butadiene-styrene copolymer; natural fibers (and fabrics derived therefrom) such as: cotton, silk, linen, wool, ramie; fur; leather and suede; synthetic fibers (and fabrics derived therefrom) such as: polyester, rayon, acrylics, nylon, polyolefin, acetates, triacetates and blends thereof; fabrics comprising a blend of natural and synthetic fibers; and composites of the foregoing materials. The process is especially useful in the precision cleaning of electronic components (e.g., circuit boards), optical or magnetic media, and medical devices and medical articles such as syringes, surgical equipment, implantable devices, and prosthesis.

The cleaning process of the invention can be used to dissolve or remove most contaminants from the surface of a substrate. For example, materials such as light hydrocarbon contaminants; higher molecular weight hydrocarbon contaminants such as mineral oils, greases, cutting and stamping oils and waxes; fluorocarbon contaminants such as perfluoropolyethers, bromotrifluoroethylene oligomers (gyroscope fluids), and chlorotrifluoroethylene oligomers (hydraulic fluids, lubricants); silicone oils and greases; solder fluxes; particulates; and other contaminants encountered in precision, electronic, metal, and medical device cleaning can be removed. The process is particularly useful for the removal of hydrocarbon contaminants (especially, light hydrocarbon oils), fluorocarbon contaminants and particulates.

The azeotrope-like compositions of the present invention are also useful for extraction. Here, cleaning involves removing contaminants (e.g., fats, waxes, oils, or other solvents) by dissolution or displacement of these materials from substances (e.g., naturally occurring materials, foods, cosmetics, pharmaceuticals).

Coating Processes

The azeotrope-like compositions can also be used in coating deposition applications, where the azeotrope-like composition functions as a carrier for a coating material to enable deposition of the material on the surface of a substrate. The invention thus also provides a coating composition comprising the azeotrope-like composition and a process for depositing a coating on a substrate surface using the azeotrope-like composition. The process comprises the step of applying to at least a portion of at least one surface of a substrate a coating of a liquid coating composition comprising (a) an azeotrope-like composition; and (b) at least one coating material that is soluble or dispersible in the azeotrope-like composition. The coating composition can further comprise one or more additives (e.g., surfactants, coloring agents, stabilizers, anti-oxidants, flame retardants, and the like). Preferably, the process further comprises the step of removing the azeotrope-like composition from the deposited coating by, e.g., allowing evaporation (which can be aided by the application of, e.g., heat or vacuum).

The coating materials that can be deposited by the process include pigments, silicone lubricious additives, stabilizers, adhesives, anti-oxidants, dyes, polymers, pharmaceuticals, cosmetics, release agents, inorganic oxides, and the like, and combinations thereof. Preferred materials include perfluoropolyethers, hydrocarbons, and silicone lubricious additives; amorphous copolymers of tetrafluoroethylene; polytetrafluoroethylene; and combinations thereof. Representative examples of materials suitable for use in the process include titanium dioxide, iron oxides, magnesium oxide, perfluoropolyethers, polysiloxanes, stearic acid, acrylic adhesives, polytetrafluoroethylene, amorphous copolymers of tetrafluoroethylene, and combinations thereof. Any of the substrates described above (for cleaning applications) can be coated via the process of the invention. The process can be particularly useful for coating magnetic hard disks or electrical connectors with perfluoropolyether lubricants or medical devices with silicone lubricious additives.

To form a coating composition, the components of the composition (i.e., the azeotrope-like composition, the coating material(s), and any additive(s) utilized) can be combined by any conventional mixing technique used for dissolving, dispersing, or emulsifying coating materials, e.g., by mechanical agitation, ultrasonic agitation, manual agitation, and the like. The azeotrope-like composition and the coating material(s) can be combined in any ratio depending upon the desired thickness of the coating, but the coating material(s) preferably constitute from about 0.1 to about 10 weight percent of the coating composition for most coating applications.

The deposition process of the invention can be carried out by applying the coating composition to a substrate by any conventional technique. For example, the composition can be brushed or sprayed (e.g., as an aerosol) onto the substrate, or the substrate can be spin-coated. Preferably, the substrate is coated by immersion in the composition. Immersion can be carried out at any suitable temperature and can be maintained for any convenient length of time. If the substrate is a tubing, such as a catheter, and it is desired to ensure that the composition coats the lumen wall, it may be advantageous to draw the composition into the lumen by the application of reduced pressure.

After a coating is applied to a substrate, the azeotrope-like composition can be removed from the deposited coating by evaporation. If desired, the rate of evaporation can be accelerated by application of reduced pressure or mild heat. The coating can be of any convenient thickness, and, in practice, the thickness will be determined by such factors as the viscosity of the coating material, the temperature at which the coating is applied, and the rate of withdrawal (if immersion is utilized).

Heat-Transfer Processes

The azeotrope-like compositions can also be used as heat-transfer fluids in heat-transfer processes where the heat-transfer fluids can transfer thermal energy (i.e., heat) either in a direct or indirect manner. Direct heat transfer (sometimes called "direct contact heat transfer") refers to a heat-transfer process wherein a heat-transfer fluid conducts heat directly (i.e., through conduction and/or convection) to and/or from a heat sink or source to a fluid by directly contacting the fluid with the heat sink or source. Examples of direct heat transfer include the immersion cooling of electrical components and the cooling of an internal combustion engine.

Indirect heat transfer refers to a heat-transfer process wherein a heat-transfer fluid (sometimes called a "working fluid") conducts heat to and/or from a heat sink or source without directly contacting the fluid with the heat sink or source. Examples of indirect heat transfer include refrigeration, air conditioning and/or heating (e.g., using heat pumps) processes, such as are used in buildings, vehicles and stationary machinery. In one embodiment, the present invention provides a process for transferring heat comprising employing an azeotropic composition in this invention as a secondary loop refrigerant. In this embodiment, the secondary loop refrigerant (i.e., a wide temperature range liquid fluid) provides a means for transferring heat between the heat source (i.e., object to be cooled) and the primary loop refrigerant (i.e., a low temperature-boiling fluid which accepts heat by expanding to a gas and rejects heat by being condensed to a liquid, typically by using a compressor). Examples of equipment in which the azeotropic composition of this invention may be useful include, but are not limited to, centrifugal chillers, household refrigerator/freezers, automotive air conditioners, refrigerated transport vehicles, heat pumps, supermarket food coolers and display cases, and cold storage warehouses.

In indirect heat-transfer processes, lubricious additives for heat transfer can be incorporated in the working fluid where moving parts are involved to ensure that the moving parts (e.g., pumps and valves) continue to work over long periods of time. These lubricious additives should possess good thermal and hydrolytic stability and should exhibit at least partial solubility in the fluid. Examples of suitable lubricious additives include mineral oils, fatty esters, highly halogenated oils such as chlorotrifluoroethylene-containing polymers, and synthetic lubricious additives such as alkylene oxide polymers.

Working Operations

The azeotrope-like compositions of the present invention can be used to formulate working fluids or lubricants that comprise the azeotrope-like compositions of the present invention and at least one fully volatile lubricious additive. A lubricious additive for working operations is defined herein as an additive that modifies the coefficient of friction between a workpiece and tooling. The azeotrope-like composition with the lubricious additive form the working fluid for the working operation. Working operations include metal, cermet, and composite workpieces.

Metals include: refractory metals such as tantalum, niobium, molybdenum, vanadium, tungsten, hafnium, rhenium, and titanium; precious metals such as silver, gold, and platinum; high temperature metals such as nickel, titanium alloys, and nickel chromes; and other metals including magnesium, copper, aluminum, steel (including stainless steels), and other alloys such as brass, and bronze. These working fluids lubricate machining surfaces, resulting in a smooth and substantially residue-free machined workpiece surface. The working fluids of the present invention in these operations also cool the machining environment (i.e., the surface interface between a workpiece and a machining tool) by removing heat and particulate matter therefrom.

Cermets are defined as a semisynthetic-product consisting of a mixture of ceramic and metallic components having physical properties not found solely in either one alone. Examples include, but are not limited to, metal carbides, oxides, and silicides. See Hawley's Condensed Chemical Dictionary, $12^{th}$ Edition, Van Nostrand Reinhold Company, 1993.

Composites are described herein as laminates of high temperature fibers in a polymer matrix, for example, a glass or carbon fiber in an epoxy resin.

This working fluid is formulated so that the cutting and forming processes are lubricated to reduce friction, heat build-up in the tool or workpiece, and prevent material transfer from the workpiece to the tool. The working fluid fully wets the working tooling and the azeotrope-like composition evaporates from the working tool and workpiece such that the lubricious additive is present as a thin film that reduces friction and heat build-up on the surfaces of the tool and workpiece, and prevents material transfer from the workpiece to the tooling. The lubricious additive is selected such that it is sufficiently high in boiling point to lubricate the working process without evaporating prematurely and still low enough in boiling point to fully evaporate from the working process so that little or no residue remains. Examples of lubricious additives for working operations include, but are not limited to, esters of $C_8$ to $C_{14}$ fatty acids, alkylene glycol ethers, hydrocarbon distillates, and esters of lactic acid.

Foam Blowing

The azeotrope-like compositions of the present invention are also useful as foam blowing agents for foamable thermoplastic and thermoset polymers to form polymeric foam. The azeotrope-like compositions can be vaporized (or combined with another compound, such as a perfluorocarbon and vaporized) in the presence of at least one foamable polymer (i.e., for thermoplastic polymers) or precursors of foamable polymers (i.e., for thermoset polymers).

Foamable polymers suitable for use in thermoplastic foamable compositions of the invention include polymers such as polyolefins, e.g., polystyrene, poly(vinyl chloride), and polyethylene. For example, foams can be prepared from styrene polymers using conventional extrusion methods. The blowing agent composition can be injected into a heat-plastified styrene polymer stream within an extruder and admixed therewith prior to extrusion to form foam. Representative examples of suitable styrene polymers include the solid homopolymers of styrene, α-methylstyrene, ring-alkylated styrenes, and ring-halogenated styrenes, as well as copolymers of these monomers with minor amounts of other readily copolymerizable olefinic monomers, e.g., methyl methacrylate, acrylonitrile, maleic anhydride, citraconic anhydride, itaconic anhydride, acrylic acid, N-vinylcarbazole, butadiene, and divinylbenzene. Suitable vinyl chloride polymers include vinyl chloride homopolymer and copolymers of vinyl chloride with other vinyl monomers. Ethylene homopolymers and copolymers of ethylene with, e.g., 2-butene, acrylic acid, propylene, or butadiene are also useful. Mixtures of different types of polymers can be employed.

Precursors of foamable polymers used to make thermoset polymers suitable for use in the foamable compositions of the invention include precursors of phenolic polymers, silicone polymers, and isocyanate-based polymers, e.g., polyurethane, polyisocyanurate, polyurea, polycarbodiimide, and polyimide. Precursors of isocyanate-based polymers are preferred, as the blowing agent compositions of the invention are especially useful for preparing polyurethane or polyisocyanurate foams.

Polyisocyanates suitable for use in the preferred compositions of the invention include aliphatic, alicyclic, arylaliphatic, aromatic, or heterocyclic polyisocyanates, or combinations thereof. Any polyisocyanate that is suitable for use in the production of polymeric foams can be utilized. Of particular importance are aromatic diisocyanates such as toluene and diphenylmethane diisocyanates in pure, modified, or crude form. MDI variants (diphenylmethane diisocyanate modified by the introduction of urethane, allophanate, urea, biuret, carbodimide, uretonimine, or isocyanurate residues) and the mixtures of diphenylmethane diisocyanates and oligomers thereof known in the art as crude or polymeric MDI (polymethylene polyphenylene polyisocyanates) are especially useful.

Representative examples of suitable polyisocyanates include ethylene diisocyanate, 1,4-tetramethylene diisocyanate, 1,6-hexamethylene diisocyanate, trimethyl hexamethylene diisocyanate, 1,1 2-dodecane diisocyanate, cyclobutane-1,3-diisocyanate, cyclohexane-1,3- and -1,4-diisocyanate (and mixtures of these isomers), disocyanato-3,3,5-trimethyl-5-isocyanatomethyl cyclohexane, 2,4- and 2,6-toluene diisocyanate (and mixtures of these isomers), diphenylmethane-2,4'- and/or -4,4'-diisocyanate, naphthalene-1,5-diisocyanate, the reaction products of four equivalents of the above-mentioned isocyanate-containing compounds with compounds containing two isocyanate-reactive groups, triphenyl methane-4,4',4"-triisocyanate, polymethylene polyphenylene polyisocyanates, m- and p-isocyanatophenyl sulfonyl isocyanates, perchlorinated aryl polyisocyanates, polyisocyanates containing carbodiimide groups, norbornane diisocyanates, polyisocyanates containing allophanate groups, polyisocyanates containing isocyanurate groups, polyisocyanates containing urethane groups, polyisocyanates containing acrylated urea groups, polyisocyanates containing biuret groups, polyisocyanates produced by telomerization reactions, polyisocyanates containing ester groups, reaction products of the above-mentioned diisocyanates with acetals, polyisocyanates containing polymeric fatty acid esters, and mixtures thereof. Distillation residues (obtained in the commercial production of isocyanates) having isocyanate groups can also be used alone or in solution in one or more of the above-mentioned polyisocyanates.

Reactive hydrogen-containing compounds suitable for use in the foamable compositions of the invention are those having at least two isocyanate-reactive hydrogen atoms, preferably in the form of hydroxyl, primary or secondary amine, carboxylic acid, or thiol groups, or a combination thereof. Polyols, i.e., compounds having at least two hydroxyl groups per molecule, are especially preferred due to their desirable reactivity with polyisocyanates. Preferred polyols are those having from 2 to about 50, preferably from 2 to about 8, more preferably from 2 to about 4, hydroxyl groups. Such polyols can be, e.g., polyesters, polyethers, polythioethers, polyacetals, polycarbonates, polymethacrylates, polyester amides, or hydroxyl-containing prepolymers of these compounds and a less than stoichiometric amount of polyisocyanate. Generally, the reactive hydrogen-containing compounds utilized in the preferred foamable compositions of the invention have a weight average molecular weight of from about 50 to about 50,000, preferably from about 500 to about 25,000.

Representative examples of suitable reactive hydrogen-containing compounds have been described, e.g., by J. H. Saunders and K. C. Frisch in High Polymers, Volume XVI, "Polyurethanes," Part I, pages 32–54 and 65–88, Interscience, New York (1962). Mixtures of such compounds are also useful, and, in some cases, it is particularly advantageous to combine low-melting and high-melting polyhydroxyl-containing compounds with one another, as described in DE 2,706,297 (Bayer AG). Useful polyols include ethylene glycol, 1,2- and 1,3-propylene glycol, 1,4- and 2,3-butylene glycol, 1,5-pentane diol, 1,6-hexane diol, 1,8-octane diol, neopentyl glycol, 1,4-bis(hydroxymethyl) cyclohexane, 2-methyl-1,3-propane diol, dibromobutene diol, glycerol, trimethylolpropane, 1,2,6-hexanetriol, trimethylolethane, pentaerythritol, quinitol, mannitol, sorbitol, diethylene glycol, triethylene glycol, tetraethylene glycol, higher polyethylene glycols, dipropylene glycol, higher polypropylene glycols, dibutylene glycol, higher polybutylene glycols, 4,4'-dihydroxydiphenyl propane, and dihydroxymethyl hydroquinone.

Phenolic polymer precursors suitable for use in the compositions of this invention include the reaction product of a phenol and an aldehyde in the presence of a catalyst. The manufacturing process is somewhat similar to that for making polyurethane foams and results in a product having greater than 90% closed cell content. Illustrative uses of phenolic foams of this invention include use for roofing insulation, as sheathing products for external wall insulation for building applications, and for shaped parts such as pipe and block insulation for industrial applications, as described in "Thermal Insulation," Encyclopedia of Chemical Technology, vol. 14, pages 648–662 (4th ed., John Wiley & Sons, 1995).

EXAMPLES

The preparation, identification, and testing of the azeotrope-like compositions of this invention are further described in the following examples. The particular materials and amounts thereof recited in these examples, as well as other conditions and details, should not be construed to unduly limit this invention. Unless otherwise specified, all percentages, proportions and ratios are by weight.

Preparations of the Fluorinated Ketones

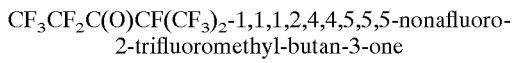
2-trifluoromethyl-butan-3-one

Into a clean dry 600 mL Parr reactor equipped with stirrer, heater and thermocouple were added 5.6 g (0.10 mol) of anhydrous potassium fluoride and 250 g of anhydrous diglyme (anhydrous diethylene glycol dimethyl ether, available from Sigma Aldrich Chemical Co. used in all subsequent syntheses). The anhydrous potassium fluoride used in this synthesis, and in all subsequent syntheses, was spray dried, stored at 125° C. and ground shortly before use. The contents of the reactor were stirred while 21.0 g (0.13 mol) of $C_2F_5COF$ (approximately 95.0 percent purity) was added to the sealed reactor. The reactor and its contents were then heated, and when a temperature of 70° C. had been reached, a mixture of 147.3 g (0.98 mol) of $CF_2=CFCF_3$ (hexafluoropropylene) and 163.3 g (0.98 mol) of $C_2F_5COF$ was added over a 3.0 hour time period. During the addition of the hexafluoropropylene and the $C_2F_5COF$ mixture, the pressure was maintained at less than 95 psig (5670 torr absolute). The pressure at the end of the hexafluoropropylene addition was 30 psig (2300 torr absolute) and did not change over the 45-minute hold period. The reactor contents were allowed to cool and were one-plate distilled to obtain 307.1 g containing 90.6% 1,1,1,2,4,4,5,5,5-nonafluoro-2-trifluoromethyl-butan-3-one and 0.37% $C_6F_{12}$ (hexafluoropropylene dimer) as determined by gas chromatography. The crude fluorinated ketone was water-washed, distilled, and dried by contacting with silica gel to provide a fractionated fluorinated ketone of 99% purity and containing 0.4% hexafluoropropylene dimers.

A fractionated fluorinated ketone made according to the same procedures as in Example 1 was purified of dimers using the following procedure. Into a clean dry 600 mL Parr reactor equipped with stirrer, heater and thermocouple were added 61 g of acetic acid, 1.7 g of potassium pernanganate, and 301 g of the above-described fractionated 1,1,1,2,4,4,5,5,5-nonafluoro-2-trifluoromethyl-butan-3-one. The reactor was sealed and heated to 60° C., while stirring, reaching a pressure of 12 psig (1400 torr absolute). After 75 minutes of stirring at 60° C., a liquid sample was taken using a dip tube, the sample was phase split and the lower phase was washed with water. The sample was analyzed using glc and showed undetectable amounts of hexafluoropropylene dimers and small amounts of hexafluoropropylene trimers. A second sample was taken 60 minutes later and was treated similarly. The glc analysis of the second sample showed no detectable dimers or trimers. The reaction was stopped after 3.5 hours, and the purified ketone was phase split from the acetic acid and the lower phase was washed twice with water. 261 g of the ketone was collected, having a purity greater than 99.6% by glc and containing no detectable hexafluoropropylene dimers or trimers.

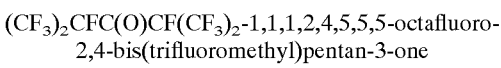
2,4-bis(trifluoromethyl)pentan-3-one 8.1 g (0.14 mol) of anhydrous potassium fluoride, 216 g (0.50 mol) of perfluoro(isobutyl isobutyrate) and 200 g of anhydrous diglyme were charged to a clean dry 600 mL Parr pressure reactor. After cooling the reactor to <0° C., 165 g (1.10 mol) of hexafluoropropylene was added to the resulting mixture. The contents in the reactor were allowed to react overnight at 70° C. with stirring, then the reactor was allowed to cool and the excess pressure in the reactor was vented to the atmosphere. The contents of the reactor were then phase split to obtain 362.5 g of lower phase. The lower phase was retained and mixed with lower phases saved from previous analogous reactions. To 604 g of accumulated lower phases containing 22% perfluoroisobutyryl fluoride and 197 g (1.31 mol) of hexafluoropropylene was added 8 g (0.1 mol) of anhydrous potassium fluoride and 50 g of anhydrous diglyme, and the resulting mixture was allowed to react in the Parr reactor in the same manner as before. This time 847 g of lower phase resulted, containing 54.4% desired material and only 5.7% perfluoroisobutyryl fluoride. The lower phase was then water washed, dried with anhydrous magnesium sulfate, and fractionally distilled to give 359 g of 1,1,1,2,4,5,5,5-octafluoro-2,4-bis(trifluoromethyl) pentan-3-one having 95.2% purity as determined by gas chromatography and mass spectroscopy ("gcms") (47% theoretical yield) and having a boiling point of 73° C.

undecafluoro-2-trifluoromethylhexan-3-one

Into a clean dry 600 mL Parr reactor equipped with stirrer, heater and thermocouple were added 5.8 g (0.10 mol) of anhydrous potassium fluoride and 108 g of anhydrous diglyme. The contents of the reactor were stirred and cooled with dry ice while 232.5 g (1.02 mol) of n-$C_3F_7COF$ (approximately 95.0 percent purity) was added to the sealed reactor. The reactor and its contents were then heated, and when a temperature of 72° C. had been reached, 141 g (0.94 mol) of $CF_2=CFCF_3$ (hexafluoropropylene) was added at a pressure of 85 psig (5150 torr absolute) over a 3.25 hour time period. During the addition of hexafluoropropylene the temperature of the reactor was increased slowly to 85° C. while maintaining the pressure at less than 90 psig (5400 torr absolute). The pressure at the end of the hexafluoropropylene addition was 40 psig (2800 torr absolute) and did not change over an additional 4-hour hold period. The lower phase was fractionally distilled to give 243.5 grams of 1,1,1,2,4,4,5,5,6,6,6-undecafluoro-2-trifluoromethylhexan-3-one, having a boiling point of 72.5° C. and a purity of 99.9% as determined by gas chromatography. The structure was confirmed by gcms.

$CF_3CH_2CF_2CH_3$-1,1,1,3,3-pentafluorobutane

This hydrofluorocarbon is available as SOLKANE™ 365 mfc fluorinated fluid from Solvay (Societe Anonyme), Brussels, Belgium.

Examples 1–3 and Comparative Examples C1–C4

Various mixtures of 1,1,1,3,3-pentafluorobutane and various fluorinated ketones were distilled at 760 torr to identify whether they formed binary azeotropes, and if so, the composition (% by weight) and boiling point (b.p.) of the azeotrope, using the following procedure. The mixtures were prepared and distilled at ambient lab pressure (760±1 torr) in a concentric tube distillation column (Model 9333, available from Ace Glass, Vineland, N.J.). In each case, the distillation was allowed to equilibrate at total reflux for at least 60 minutes. For each distillation, six successive distillate samples, each approximately 5 percent by volume of the total liquid charge, were taken while operating the column at a liquid reflux ratio of 20 to 1. The compositions of the distillate samples were then analyzed using an HP-5890 Series II Plus Gas Chromatograph with an RTX-200 capillary column (available from Restek Corporation, Bellefonte, Pa.), and a thermal conductivity detector. The boiling point of each distillate was measured using a thermocouple. Following this test procedure, azeotropes of 1,1,1,3,3-pentafluorobutane were identified with $CF_3CF_2C(O)CF(CF_3)_2$, $(CF_3)_2CFC(O)CF(CF_3)_2$ and $CF_3CF_2CF_2C(O)CF(CF_3)_2$.

Closed-cup flash points for each identified azeotrope and parent solvent were also measured, following the procedure described in ASTM D-3278.

The azeotropes and their parent neat solvents were then tested for their ability to dissolve normal hydrocarbons of increasing molecular weight according to a test procedure similar to that described in U.S. Pat. No. 5,275,669 (Van Der Puy et al.), the description of which is incorporated herein by reference. Following this test procedure, 0.5 to 2 mL of the test azeotrope-like composition was added to a vial. An equal volume of n-hexane (n-$C_6H_{14}$) was then added to the same vial. The vial was sealed by closing the lid, then the vial was shaken to mix the two components. If a cloudy mixture or a phase split occurred after settling undisturbed for several minutes, the azeotrope-like composition was given an LSH ("largest soluble hydrocarbon") rating of <6. If a clear solution resulted with n-hexane, the test was repeated, substituting n-heptane (n-$C_7H_{16}$) for n-hexane. If a cloudy mixture or a phase split then occurred with n-heptane, the azeotrope-like composition was given an LSH rating of 6. The test was continually repeated with higher homologue n-alkanes until a cloudy mixture or a phase split was observed. The LSH rating given corresponded to the carbon chain length of the largest soluble n-alkane which formed a homogeneous solution at equal volumes with the test azeotrope-like composition. For example, if n-nonane (n-$C_9H_{20}$) was the largest soluble n-alkane but n-decane (n-$C_{10}H_{22}$) caused a phase split, the LSH rating was recorded as 9. All LSH ratings were determined at room temperature.

In TABLE 1 shown below, the compositions (% by weight), boiling points (at 760 torr), and closed-cup flash points of the three azeotropes and parent neat solvents are presented as Examples 1–3 and Comparative Examples C1–C4, respectively. Also presented in TABLE 1 are the LSH ratings for each azeotrope and parent solvent.

TABLE 1

| Ex. | Composition | b.p. (° C.) | Closed-cup flash point (° C.) | LSH |
|---|---|---|---|---|
| 1 | 48.3% $CF_3CH_2CF_2CH_3$ 51.7 % $CF_3CF_2C(O)CF(CF_3)_2$ | 35.4 | No flash | 9 |
| 2 | 79.0 % $CF_3CH_2CF_2CH_3$ 21.0 % $(CF_3)_2CFC(O)CF(CF_3)_2$ | 39.6 | No flash | 9 |
| 3 | 86.7 % $CF_3CH_2CF_2CH_3$ 13.3 % $CF_3CF_2CF_2C(O)CF(CF_3)_2$ | 39.9 | No flash | 9 |
| C1 | $CF_3CH_2CF_2CH_3$ | 40.0 | −22 | 9 |
| C2 | $CF_3CF_2C(O)CF(CF_3)_2$ | 49 | No flash | 6 |
| C3 | $(CF_3)_2CFC(O)CF(CF_3)_2$ | 71.5 | No flash | 6 |
| C4 | $CF_3CF_2CF_2C(O)CF(CF_3)_2$ | 74 | No flash | 6 |

The data in TABLE 1 show that lower boiling azeotropes form between 1,1,1,3,3-pentafluorobutane and each of $CF_3CF_2C(O)CF(CF_3)_2$, $(CF_3)_2CFC(O)CF(CF_3)_2$ and $CF_3CF_2CF_2C(O)CF(CF_3)_2$. The data also show that these azeotropes have no closed-cup flash points, indicating that the azeotropes are non-flammable. Also, the LSH value measured for each azeotrope was equivalent to that measured for neat 1,1,1,3,3-pentafluorobutane, the better solubilizing of the two parent solvents in each azeotrope.

Examples 4–15

In this series of experiments, closed-cup (ASTM D-3278) flash points were determined for various blends of 1,1,1,3,3-pentafluorobutane (PFB) and either $CF_3CF_2C(O)CF(CF_3)_2$ (C6 PFK), $(CF_3)_2CFC(O)CF(CF_3)_2$ (i,i-C7 PFK) or $CF_3CF_2CF_2C(O)CF(CF_3)_2$ (n,i-C7 PFK).

Results are presented in TABLE 2.

TABLE 2

| | Percent by weight of: | | | | Closed-Cup Flash |
|---|---|---|---|---|---|
| Ex. | PFB | C6 PFK | i,i-C7 PFK | n,i-C7 PFK | Point (° C.) |
| 4 | 70 | 30 | — | — | No flash |
| 5 | 80 | 20 | — | — | No flash |
| 6 | 85 | 15 | — | — | No flash |
| 7 | 90 | 10 | — | — | No flash |
| 8 | 95 | 5 | — | — | No flash |
| 9 | 60 | — | 40 | — | No flash |
| 10 | 70 | — | 30 | — | No flash |
| 11 | 80 | — | 20 | — | No flash |
| 12 | 90 | — | 10 | — | No flash |
| 13 | 95 | — | 5 | — | No flash |
| 14 | 90 | — | — | 10 | No flash |
| 15 | 95 | — | — | 5 | No flash |

The data in TABLE 2 show that the azeotrope-like compositions containing 1,1,1,3,3-pentafluorobutane and all three fluorinated ketones showed no closed-cup flash points at PFB levels of at least 95%.

Examples 16–18

Percentage ranges for azeotrope-like compositions of this invention were identified by determining boiling points of test mixtures of 1,1,1,3,3-pentafluorobutane (PFB) with either $CF_3CF_2C(O)CF(CF_3)_2$ (C6 PFK), $(CF_3)_2CFC(O)CF(CF_3)_2$ (i,i-C7 PFK) or $CF_3CF_2CF_2C(O)CF(CF_3)_2$ (i,i-C7 PFK) using an ebulliometer or boiling point apparatus (specifically a Model MBP-100 available from Cal-Glass for Research, Inc., Costa Mesa, Calif.). To run this test, the lower boiling component of the test compositions (typically an amount of 25 to 30 mL) was added to the boiling point apparatus, heated and allowed to equilibrate to its boiling point (typically about 30 minutes). After equilibration, the boiling point was recorded, approximately 1.0 mL aliquot of the higher boiling component was added to the apparatus, and the resulting new composition was allowed to equilibrate for about 15 minutes, at which time the boiling point was recorded. The test continued basically as described above, with additions to the test mixture of about 1.0 mL of the higher boiling point component occurring every 15 minutes until 25 to 30 mL of the higher boiling point component had been added. The presence of an azeotrope-like composition was noted when the test mixture exhibited a lower boiling point than the boiling point of the lower boiling component (i.e., 1,1,1,3,3-pentafluorobutane).

The resulting azeotrope-like composition ranges are presented in TABLE 3. All boiling point determinations were run at a pressure of 760±1 torr.

TABLE 3

| Ex. | Fluorinated Ketone | Fluorinated Ketone Conc. (wt. % range) | PFB Conc. (wt. % range) |
| --- | --- | --- | --- |
| 16 | C6 PFK | 1.0–87.5 | 12.5–99.0 |
| 17 | i,i-C7PFK | 1.0–39.0 | 61.0–99.0 |
| 18 | n,i-C7 PFK | 1.0–26.5 | 73.5–99.0 |

Examples 19–22

The solubility of a variety of fluorinated and non-fluorinated oils in 50/50 and 20/80 $CF_3CF_2C(O)CF(CF_3)_2$ (C6 PFK)/1,1,1,3,3-pentafluorobutane (PFB) azeotropic-like compositions (both non-flammable) was determined by weighing a sample of the azeotropic-like composition or one of the parent solvents (i.e., neat PFB or C6 PFK) in a tared screwcap glass vial. Small increments of the test oil were then added to the azeotropic mixture or parent solvent until the test oil was no longer soluble. This point of insolubility was determined visually as the point at which the mixture became non-homogeneous, i.e., two phases or a cloudy mixture formed after vigorous mixing. The vial and its contents were then reweighed to determine the amount of test oil added to produce insolubility, and the maximum concentration of oil in the solvent was calculated. The following test oils were used:

Mineral Oil—a white, light paraffin oil (density=0.838 g/cm$^3$), available from Sigma Aldrich Chemical Company.

Silicone Oil—MED-361 silicone oil (viscosity=350 cps), available from NuSil Silicone Technology, Santa Barbara, Calif.

PFPE Oil—BRAYCO™ 815Z perfluoropolyether oil, available from Castrol Industrial, Irvine, Calif.

Polyester Oil—ICEMATIC™ SW-22 polyester oil, available from Castrol Industrial.

Solubility results are presented in TABLE 4.

TABLE 4

| | | Solubility (%) in: | | | |
| --- | --- | --- | --- | --- | --- |
| Example | Test Oil | C6 PFK | PFB | 50/50 C6 PFK/PFB | 20/80 C6 PFK/PFB |
| 19 | Mineral Oil | 0.2 | 0.3 | 0.1 | 0.1 |
| 20 | Silicone Oil | 0.1 | 0.1 | 0.1 | 0.3 |

TABLE 4-continued

| | | Solubility (%) in: | | | |
| --- | --- | --- | --- | --- | --- |
| Example | Test Oil | C6 PFK | PFB | 50/50 C6 PFK/PFB | 20/80 C6 PFK/PFB |
| 21 | PFPE Oil | miscible | 2.0 | miscible | 5.3 |
| 22 | Polyester Oil | 0.8 | miscible | 7.3 | miscible |

The data in TABLE 4 show that, with the exception of the mineral oil, the non-flammable azeotrope-like compositions of this invention provided overall solubilization of the oils that was at least equivalent to either of the parent solvents.

Examples 23–24

Polyurethane foams were blown using azeotrope-like compositions of this invention as blowing agents using the following test procedure. A mixture of 31.7 g of 1,1,1,3,3-pentafluorobutane and 3.5 grams of either $CF_3CF_2C(O)CF(CF_3)_2$ (C6 PFK) (for Example 23) or $CF_3CF_2CF_2C(O)CF(CF_3)_2$ (n,i-C7 PFK) (for Example 24) was emulsified with 122 g of POLYOL 1832 A2 (polyether polyol having a hydroxy equivalent weight of 520 mg KOH/g, a water content of 4.6 pbw, a catalyst content of 3.7 g N,N-dimethylcyclohexylamine and a viscosity of about 820 cps at 25° C., available from Bayer AG under the trade name BAYTHERM™ VP-PU 1751 A/2), with 3.5 g silicone surfactant B-8423 (available from T. H. Goldschmidt), using a Pendraulic LD-50 high shear mixer set at 6000 rpm. To this emulsion was added 199 g. of DESMODUR™ 44 V-20 (polymeric isocyanate having an isocyanate content of 31.5% by weight and a viscosity of 200±40 cps at 25° C., available from Bayer AG), while mixing at 6000 rpm for 15 seconds. The resulting mixture was poured into a 350 cm×350 cm×60 cm aluminum mold preheated to 50° C. Density, initial thermal conductivity and thermal conductivity after aging for 2 weeks at 50° C. were measured for the cured foam samples. Results are presented in TABLE 5.

TABLE 5

| Ex. | Fluorinated Ketone | Density (kg/m3) | Init. Thermal Conductivity (mW/mK) | Aged Thermal Conductivity (mW/mK) |
| --- | --- | --- | --- | --- |
| 23 | C6 PFK | 28.4 | 21.1 | 23.6 |
| 24 | (n,i-C7 PFK) | 29.1 | 21.2 | 23.1 |

The data in TABLE 5 show that the azeotrope-like compositions of this invention performed well as foam blowing agents.

Examples 25–38

Evaluations of working fluids were conducted using working fluid formulations comprising azeotrope-like compositions of this invention. Each formulation consisted of 2% lubricious additive for working operations and the remainder being an azeotrope-like composition of 20/80 $CF_3CF_2C(O)CF(CF_3)_2$ (C6 PFK)/1,1,1,3,3-pentafluorobutane (PFB). Each formulation was tested for coefficient of friction (COF) under cutting conditions for aluminum using a CETR Microtribometer (available from Center for Tribology, Inc., Mountain View, Calif.) equipped with a 440C steel ball of 9.5 mm diameter and a 2024 aluminum disk (about 6.25 cm in diameter). Prior to testing, the disk was polished using a Buehler metallographic grinding/polishing unit (available from Buehler Ltd., Lake Bluff, Ill.) equipped with 400 grit abrasive paper. The disk was mounted on the turntable of the tribometer and the ball was mounted in a fixture such that the ball was stationary. Each test was run at a constant velocity of 125,600 mm/min at the ball and a load of 5 Newtons on the ball. The load was applied in the first 5 seconds of the test and was then held at 5 Newtons over the next 15 seconds. The lateral and downward force values were recorded over time using the load cell of the Microtribometer, and COF was calculated for each instant of time by dividing the lateral force by the downward force. Each working fluid formulation was tested by adding the formulation to the center of the spinning disk at a rate of about 20 mL/min using a syringe. The fixed steel ball was then moved into contact with the disk, and fluid flow was stopped when the downward force exceeded about 1 Newton as indicated by the instrument. Subsequently, no more working fluid was added. Each test in a series was run at a new position on the same disk and at a new sector of the steel ball. Each working fluid formulation was tested in triplicate, with average COF values recorded. The COF values were then plotted as a function of time. The "break time" was defined as when the COF began increasing dramatically with time. Good working fluids have COF values from about 0.1 to about 0.2, while poor working fluids have COF values of about 0.5 or higher. It can be seen that less desirable working fluids can initially show good COF value, but transition to poor COF values over time. It is desirable that the break time be at least 20 seconds for a working fluid to be considered good. Additives never producing low COF values were assigned a break time of zero. Those working fluids that do not exhibit a COF break during the course of the experiments were assigned a break time of >20. Results are summarized in TABLE 6.

TABLE 6

| Example | Lubricious additive | COF | Break Time (sec) |
| --- | --- | --- | --- |
| 25 | Ethylene glycol n-butyl ether | 0.110 | >20 |
| 26 | Diethylene glycol n-butyl ether | 0.116 | >20 |
| 27 | Propylene glycol t-butyl ether | 0.480 | 1.5 |
| 28 | Propylene glycol n-butyl ether | 0.161 | 18.9 |
| 29 | Dipropylene glycol t-butyl ether | 0.105 | >20 |
| 30 | Dipropylene glycol n-butyl ether | 0.104 | >20 |
| 31 | Ethyl lactate | 0.615 | 0 |
| 32 | Ethylhexyl lactate | 0.182 | >20 |
| 33 | ISOPAR ™ G* | 0.640 | 0 |
| 34 | ISOPAR ™ L* | 0.224 | 16.0 |
| 35 | Ethyl hexanoate | 0.552 | 0 |
| 36 | Ethyl octanoate | 0.073 | >20 |
| 37 | Ethyl decanoate | 0.064 | >20 |
| 38 | Ethyl laurate | 0.064 | >20 |

The results in TABLE 6 show that the azeotrope-like compositions of this invention are effective in combination with a lubricious additive as a working fluid.

Various modifications and alterations of this invention will be apparent to those skilled in the art without departing from the scope and spirit of this invention. It should be understood that this invention is not intended to be unduly limited by the illustrative embodiments and examples set forth herein and that such examples and embodiments are presented by of example only with the scope of the invention intended to be limited only by the claims as set forth herein as follows.

What is claimed is:

1. An azeotrope-like composition comprising:
   (a) 1,1,1,3,3-pentafluorobutane; and
   (b) fluorinated ketone; wherein said composition is selected from the group consisting of:
      (i) compositions consisting essentially of about 12.5 to about 99.0 weight percent of 1,1,1,3,3-pentafluorobutane and about 1.0 to about 87.5 weight percent of $C_2F_5C(O)CF(CF_3)_2$ that boil below about 40° C. at about 760 torr;
      (ii) compositions consisting essentially of about 61.0 to about 99.0 weight percent of 1,1,1,3,3-pentafluorobutane and about 1.0 to about 39.0 weight percent of $(CF_3)_2CFC(O)CF(CF_3)_2$ that boil below about 40° C. at about 760 torr; and
      (iii) compositions consisting essentially of about 73.5 to about 99.0 weight percent of 1,1,1,3,3-pentafluorobutane and about 1.0 to about 26.5 weight percent of $CF_3CF_2CF_2C(O)CF(CF_3)_2$ that boil below about 40° C. at about 760 torr.

2. An azeotrope-like composition comprising:
   (a) 1,1,1,3,3-pentafluorobutane; and
   (b) fluorinated ketone; wherein said composition is selected from the group consisting of:
      (i) compositions consisting essentially of about 12.5 to about 95.0 weight percent of 1,1,1,3,3-pentafluorobutane and about 5.0 to about 87.5 weight percent of $C_2F_5C(O)CF(CF_3)_2$ that boil below about 40° C. at about 760 torr;
      (ii) compositions consisting essentially of about 61.0 to about 95.0 weight percent of 1,1,1,3,3-pentafluorobutane and about 5.0 to about 39.0 weight percent of $(CF_3)_2CFC(O)CF(CF_3)_2$ that boil below about 40° C. at about 760 torr; and
      (iii) compositions consisting essentially of about 73.5 to about 95.0 weight percent of 1,1,1,3,3-pentafluorobutane and about 5.0 to about 26.5 weight percent of $CF_3CF_2CF_2C(O)CF(CF_3)_2$ that boil below about 40° C. at about 760 torr; wherein said composition has no closed-cup flash point.

3. An azeotrope composition consisting essentially of:
   (a) 1,1,1,3,3-pentafluorobutane; and
   (b) fluorinated ketone; wherein said composition is selected from the group consisting of:
      (i) compositions consisting essentially of about 48.3 weight percent of 1,1,1,3,3-pentafluorobutane and about 51.7 weight percent of $C_2F_5C(O)CF(CF_3)_2$ that boil at about 35.4° C. at about 760 torr;
      (ii) compositions consisting essentially of about 79.0 weight percent of 1,1,1,3,3-pentafluorobutane and about 21.0 weight percent of $(CF_3)_2CFC(O)CF(CF_3)_2$ that boil at about 39.6° C. at about 760 torr; and
      (iii) compositions consisting essentially of about 86.7 weight percent of 1,1,1,3,3-pentafluorobutane and about 13.3 weight percent of $CF_3CF_2CF_2C(O)CF(CF_3)_2$ that boil at about 39.9 at about 760 torr.

4. A process for depositing a coating on a substrate surface comprising the step of applying to at least a portion of at least one surface of the substrate a liquid coating composition comprising:
   (a) an azeotrope-like composition according to claim 1; and
   (b) at least one coating material that is soluble or dispersible in the azeotrope-like composition.

5. A coating composition consisting essentially of an azeotrope-like composition according to claim 1 and a coating material.

6. A working fluid comprising the azeotrope-like composition according to claim 1 and a lubricious additive.

7. The working fluid according to claim 6, wherein said lubricious additive is volatile.

8. A process for removing contaminants from the surface of a substrate comprising the step of contacting the substrate with one or more of the azeotrope-like compositions according to claim 1 until the contaminants are dissolved, dispersed, or displaced in or by the azeotrope-like composition, and removing the azeotrope-like composition containing the dissolved, dispersed or displaced contaminants from the surface of the substrate.

9. A process for heat transfer wherein one or more of the azeotrope-like compositions according to claim 1 is used as a heat-transfer fluid.

10. A process for foam blowing wherein one or more of the azeotrope-like compositions according to claim 1 is used as a foam blowing agent.

11. A process for metal, cermet, or composite working fluid wherein said process is lubricated using the working fluid of claim 7.

* * * * *

UNITED STATES PATENT AND TRADEMARK OFFICE
CERTIFICATE OF CORRECTION

PATENT NO. : 6,423,673 B1  Page 1 of 1
DATED : July 23, 2002
INVENTOR(S) : Owens, John G.

It is certified that error appears in the above-identified patent and that said Letters Patent is hereby corrected as shown below:

Column 9,
Line 63, "carbodimide" should read -- carbodiimide --.

Column 10,
Line 4, "1,1 2-dodecane" should read -- 1,12-dodecane --.
Line 6, "disocyanato-" should read -- diisocyanato- --.

Column 11,
Line 61, "pernanganate" should read -- permanganate --.

Column 14,
Line 62, "(l,l-C7 PFK)" should read -- (n,i-C7 PFK) --.

Column 17,
Line 36, following TABLE 6, please insert -- * available from EXXON Chemical, Houston, TX. All other lubricious additives are available from Sigma-Aldrich, Milwaukee, WI. --.
Line 45, "presented by of example" should read -- presented by way of example --.

Signed and Sealed this

Twenty-eighth Day of January, 2003

JAMES E. ROGAN
*Director of the United States Patent and Trademark Office*